United States Patent [19]

Eide

[11] Patent Number: 5,507,690
[45] Date of Patent: Apr. 16, 1996

[54] METHOD AND APPARATUS FOR CUTTING SLICES FROM FISH FILLETS WITH THE SKIN STILL ON

[75] Inventor: Ragnar Eide, Stavanger, Norway

[73] Assignee: Trio Industrier AS, Forus, Norway

[21] Appl. No.: 338,586

[22] PCT Filed: May 10, 1993

[86] PCT No.: PCT/NO93/00074
§ 371 Date: Nov. 14, 1994
§ 102(e) Date: Nov. 14, 1994

[87] PCT Pub. No.: WO93/22929
PCT Pub. Date: Nov. 25, 1993

[30] Foreign Application Priority Data

May 14, 1992 [NO] Norway ......................... 921899

[51] Int. Cl.⁶ ........................... A22C 25/17; A22C 25/18
[52] U.S. Cl. ............................... 452/161; 452/126
[58] Field of Search ........................ 452/161, 126, 452/125

[56] References Cited

U.S. PATENT DOCUMENTS

| | | | |
|---|---|---|---|
| 1,921,440 | 8/1933 | Taylor | 452/126 |
| 4,628,570 | 12/1986 | Wenzel | 452/125 |
| 4,649,604 | 3/1987 | Braeger | 452/125 |
| 4,765,030 | 8/1988 | Dubowik | 452/126 |

FOREIGN PATENT DOCUMENTS

| | | | |
|---|---|---|---|
| 0054801 | 1/1935 | Norway | A22C 25/17 |
| 0109486 | 7/1966 | Norway | A22C 25/17 |
| 0163351 | 2/1990 | Norway | A22C 25/17 |

*Primary Examiner*—Willis Little
*Attorney, Agent, or Firm*—Fitch, Even, Tabin & Flannery

[57] ABSTRACT

The invention relates to longitudinal cutting of fish fillet pieces substantially parallel with the skin side (S) of the original fillet. This cutting in layers or slices takes place in that the fish fillet (F, F1) is brought into contact with a rotating cooled freezing drum (7, 7') which freezes the fillet (F2) at the skin side (S) and conveys it in retained position against the operative cutting edge of a driven, endless band knife (18). During the rotation of the drum (7, 7'), the operative cutting edge of the band knife (18) is displaced stepwise in relation to the drum circumference between two successive revolutions of the drum (7, 7'), in order to cut a fish meat slice (FS) successively for each drum revolution.

8 Claims, 2 Drawing Sheets

METHOD AND APPARATUS FOR CUTTING SLICES FROM FISH FILLETS WITH THE SKIN STILL ON

BACKGROUND OF THE INVENTION

The present invention relates to a method for cutting slices from fish fillers with the skin still on, wherein the fillet is fed toward a freezing drum causing freezing and anchoring of the fillet at the skin side, whereby the longitudinal direction of the fillet preferably is orientated in the circumferential direction of the drum, and wherein a cutting tool, preferably in the form of a driven endless band knife, is positioned with the operative cutting edge thereof at a (radial) distance from the drum mantle surface, and wherein, from the fillet adhering to the drum through freezing, a fish meat slice is cut, the cutting plane extending substantially parallel with the drum circumference.

It is previously known methods and machines adapted to cut the skin from the fillet, wherein is utilized a rotating freezing drum, i.e. a drum being frozen down to beneath the freezing point. When wet fillets with the skin side thereof come into contact with the rotating freezing drum, they become frozen to the circumferential surface of the drum, where they are kept securely in place while being conducted toward a cutting device in the form of a band knife which cuts the fillet free from the skin, and wherein the skin is scraped off from the drum by means of a scraper means following the band knife and permanently contacting the drum surface. This known method and machine are well suited for skinning (flaying) fish fillets, but they are not suitable for cutting a toneless fillet slice at the skinless fillet side, and the stationary scraper means renders it impossible to divide a fillet into several parallel slices, each extending substantially parallel with the skin side.

Norwegian patent specification No. 54 801 discloses methods and devices for anchoring fish fillets upon the removal of the skin or other treatment. According to this patent specification, it is likewise used a retaining surface operating through freezing and which, thus, freezes the fillet during the skin removal or other treatment, whereafter the freezing of the fish fillet is neutralized through thawing. In rational fillet treatment, thawing is a too slow process.

Norwegian patent specification No. 109 486 discloses an apparatus for treating fish, comprising a conveyor movable along a closed path and having the form of a freezing surface retaining the fish through freezing during the treatment, the fish in frozen position being conveyed past a stationarily placed treating tool. The movable freezing conveyor consists of a freezing drum assigned a scraper means permanently attacking on the external mantle face of the drum, serving to scrape off those pieces of the fish which have become frozen to the drum as well as to scrape off any hoar and ice formations. This known apparatus is especially well suited for the skinning of herring; it does not allow to divide a fish fillet "into layers" parallel with the skin side.

With filleting, processing and further cutting of fine kinds of fish such as salmon and trout, it has been found that dividing the fillet into several slices substantially parallel with the two main faces of the fillet may result in substantial advantages in various connections. Such a division of salmon and trout will i.a. result in a quicker smoking of such slices, resulting in a better quality product, simultaneously as the wastage is reduced.

Thus, each fillet is cut into two or more such slices, parallel with the main faces of the fillet.

SUMMARY OF THE INVENTION

The object of the present invention has been to provide a method and a machine well suited to accomplish the dividing operations just mentioned, the slicing-up representing a new way of dividing fillets.

In accordance with the invention, said object is realized through proceeding as set forth in the independent method claim, said method appropriately being carried out by means of a machine as defined in the independent apparatus claim. Subordinate, advantageous features are made the subject matter of dependent claims.

A machine according to the invention includes a freezing drum known per se and adapted to retain the fish fillet or several fish fillets through freezing and to convey them past a stationarily placed cutting tool (which may have a self-motion) set at such a distance in relation to the mantle face of the drum that said tool upon passage of the fillets may cut a slice having a predetermined thickness, parallel with the skin side, the drum being assigned at least one movable scraper means. Upstream, the drum is assigned a movable flap adapted to open and close the admission to the drum and to be controlled such that the flap—in case one intends to cut two or more parallel slices from one or more fillets—will let past itself a "length" corresponding to one or more fillets which together do not cover the entire drum in the circumferential direction. The cutting device, preferably constituted by a band knife, is assigned a programmed controller serving to position the operative cutting edge of the band knife at the desired distance from the drum circumference, for cutting the first slice. During the slicing or slice cutting, the one or more movable scraper means are displaced to The inoperative position thereof, in which they do not interfere with the cutting process.

When cutting the first slice, the programmed controller may have positioned the operative cutting edge of the band knife at a distance of e.g. 15 mm from the circumferential face of the drum, whereby the band knife effects cutting-off of the outermost slice front the fillets, said cut off slices being conducted out of the machine as finished fresh goods, or they may be treated further, e.g. smoked. Subsequent to this first slicing or slice cutting, the controller makes provision for—while the portion of the drum circumference not covered by fillets passes the band knife—to displace the bank knife to a new programmed position, in which the cutting edge is e.g. 2 mm closer to the drum's circumferential face than at the first programmed position. When the fillets for the second time pass the band knife, the latter will cut a new slice, parallel with the skin side, 2 mm thick, said thin slices during second time's cutting being taken out of the machine, while the remaining fillet pieces which still adhere to the skin, are retained on the drum through freezing and rotate together with the drum. This procedure is repeated until one has cut off the number of slices desired and which is consistent with the original fillet thickness. Thereafter, the programmed controller transmits a signal to the movable scraper means which, thereby, are brought into contact with the drum surface, while the drum portion not covered by fillet passes; the drum continues its rotation and becomes scraped clean and made ready for a new positioning and freezing of one or more fillets. Thereafter, the controller transmits a signal to said movable flap which opens the admission to the drum for one or more new fillets, as soon as the movable scraper means have been brought into inoperative positions withdrawn from the area that will be passed by the fillets.

With small amounts to be treated/processed, i.e. small amounts of fish fillet to be divided into parallel slices this manner, the process may be operated manually, i.e. without controller. It represents no technical problems achieving individual fish slice thickness. With individual slice thickness as well as with equal thickness, the band knife is adapted to be displaced step by step in the direction toward the drum's circumferential surface.

BRIEF DESCRIPTION OF THE DRAWINGS

The invention is further explained in the following connection with an examplary embodiment shown in the accompanying drawings, wherein:

FIG. 1 and 2 show side elevational views of a machine for cutting slices from fish fillets, some movable parts occupying mutually differing positions in the two figures of the drawings, in that:

FIG. 1 shows the machine in an initial and fillet processing position, wherein the flap controlling the supply of fillet to the freezing drum occupies an open position, and wherein the movable scraper means occupy the inoperative positions thereof, withdrawn from the rotational path of the fillets when these are frozen to the mantle face of the drum;

FIG. 2 corresponds to FIG. 1, but here said flap occupies its closed position, the scraper means occupying the operative scraping positions thereof.

DESCRIPTION OF THE PREFERRED EMBODIMENT

Figure 1:
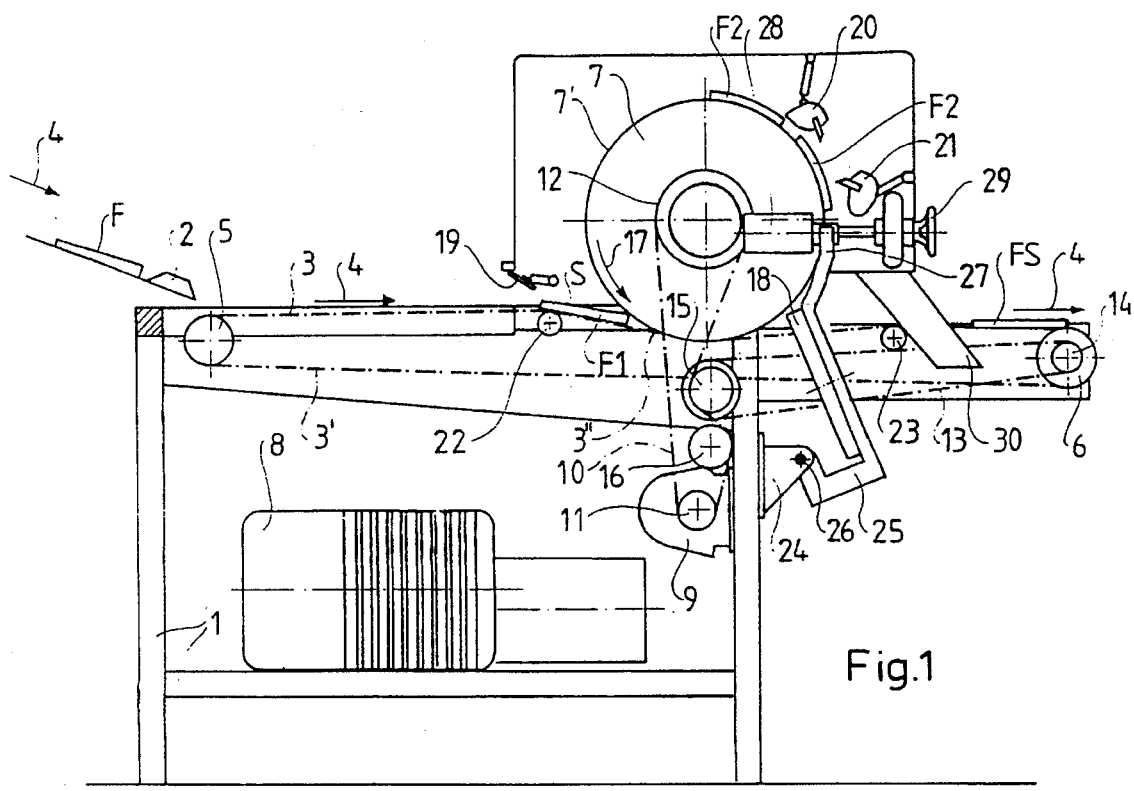

In the drawings, reference numeral 1 denotes the machine frame, at the insertion end thereof a supply chute 2 for fish fillet F to an endless belt conveyor 3 is mounted. The conveying belt extends in the longitudinal direction/the fillet feeding direction 4 and is laid around a turning roller 5 at the upstream side of the machine and a drive roller 6 at the downstream side of the machine. The material of the conveying belt 3 and the suspension thereof are such that the belt has a limited elastic resilience laterally. The lower portion of the conveying belt 3 is denoted at 3'.

In the machine frame 1, an in per se known freezing drum 7 has been supported, the freezing aggregate thereof being denoted at reference numeral 8.

A gear motor 9 mounted on the machine frame 1, serves to operate both the freezing drum 7 and the conveying belt 3. A first chain 10 is laid around a sprocket 11 on the gear motor's 9 shaft and a sprocket 12 on the freezing drum 7, while a second chain 13 is laid partly around a sprocket 14 on the drive roller 6 of the conveying belt 3, partly around a freely rotatably supported sprocket 15 driven by first chain 10, reference numeral 16 denoting a tension sprocket.

The rotational direction 17 of the freezing drum 7 is counterclockwise.

The fish fillets F to be processed in the machine have the skin thereon, and they are laid into the supply chute 2 skin side up. Thus, one or more fillets F are conveyed toward the freezing drum 7, laying on the conveying belt 3 skin side up. The skin side of the fillet F is, thus, that fish portion first to come into contact with the mantle face 7' of the freezing drum 7. This is illustrated by a fillet F1 just entered into contact with the mantle face 7' of the drum 7, the skin side of the fillet being denoted with the letter S.

The freezing drum 7 operates according to a principle known per se with fish processing in general, namely that the wet fillet freezes to the circumferential surface 7' of the drum, where it is securely anchored while being displaced toward and past a cutting tool, e.g. a driven endless band knife 18 of a design known per se.

Figure 2:
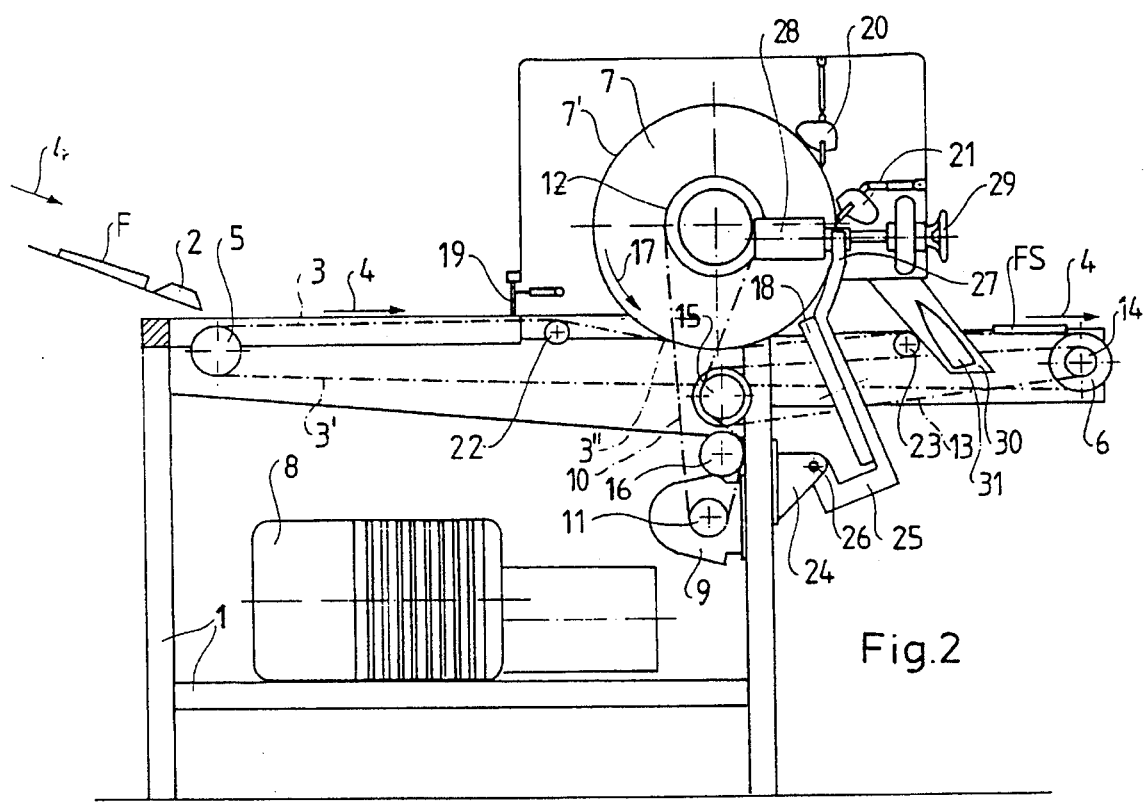

At a predetermined distance upstream the freezing drum 7, a movable flap 19 has been arranged. In FIG. 1, the flap has been shown in open, swung-up position, in which it allows admission for fillets F, F1 to the drum 7. In FIG. 2, the flap is shown in swung-down closure position, in which it blocks fillet admission to the drum 7.

This movable flap 19 is controlled, preferably electronically and automatically. In case one intends to cut several parallel slices from one or each of a plurality of fish fillets F, F1, F2, parallel with the main faces thereof, i.e. parallel with the skin side S, the flap 19 is controlled such that it only will let a "length" of fish fillets pass past it, comprising one or more fillets which together will not cover the entire drum circumference when the fillet or the fillets are frozen to the mantle face of the drum and extend with the longitudinal direction thereof in the circumferential direction of the drum.

Reference numerals 20 and 21 denote displaceable scraper means movable between an operative position, FIG. 2, wherein they scrape the mantle face of the drum free from frozen skin, etc., and an inoperative position, FIG. 1, wherein they are withdrawn, not only from scraping contact with the mantle face of the drum, but so far away from the same that the fillets F2, FIG. 1, adhering through freezing action, may pass the scraper means 20, 21 unimpededly upon the rotation of the drum 7.

As previously mentioned, the conveying belt 3,3' has, partly due to inherent material properties, partly due to the suspension thereof, a certain elastic resilience laterally. The resiliency of the conveying belt 3,3' is shown in the area of the freezing drum 7, beneath the same, where the upper portion of the conveying belt 3,3' at any time passes through a deflected portion 3" between an upstream support roller 22 and a downstream support roller 23, the deflected portion 3" of said upper portion, in an intermediate area between the support rollers 22, 23, following a course substantially corresponding to the radius of the drum 7. Such an arrangement has be found to favour the delivery of fish fillet F1 from conveying belt 3 to freezing drum 7 such that the freezing of the skin side S of the fillet F1 to the drum mantle is secured and effected at an appropriate stage of the transport.

When one or more fish fillets F2, adhering with the skin side S to the circumferential face of the drum 7, are conducted past the band knife's 18 cutting edge, which is set at a predetermined (radial) distance from the drum surface 7' smaller than the thickness of the fillet F2, said cutting edge effects the cutting of a slice from the skinfree side of the fillet, which during the cutting-off extends substantially parallel with the drum circumference, i.e. parallel with the two main faces of the fillet, consequently the skin side and the skinfree fillet side. This first slice will be free of socalled "thick-fish-bones" (fish bones extending approximately perpendicular to the skin side) and represents a novel product of optimum quality. With small thin fillets, it might be assumed that the skin thereafter does not contain sufficient fish meat to allow the cutting of a second or a plurality of further slices parallel with the first one. However, with larger thicker fillets, one may utilize the invention optimally and effect a displacement of the band knife in relation to the fillets F2 on the drum that secures dividing of one or each fillet into two or more such large slices, the division planes extending substantially parallel with the skin side.

To this end, for the displaceable suspension of the band knife 18, a bracket 24 has been mounted on the machine frame 1, and the frame 25 of the band knife 18 is pivotally suspended in The bracket 24 by means of a horizontal rotary shaft or pivot 26. An arm 27 of the band knife frame 25 engages a drive device 28 for stepwise rotation of the frame 25 and, consequently, the cutting edge of the band knife 18 in relation to the freezing drum. This drive device 28 can be operated from a wheel 29 for manual fish slice thickness adjustment, og it can be controlled electronically by means of a programmed control unit. The drive device 28 may be constituted by any suitable mechanism and can e.g. comprise a motion screw adapted for stepwise rotation and with which the arm 27 of the bank knife frame 25 cooperates.

Thus, when said first fish meat slice is separated from the rest of the fillet F2 still adhering to the drum 7, the drive device 28 (either through the hand wheel 29 or through electronics) makes provision for setting the cutting edge of the band knife 18 e.g. 2 mm closer to the circumference 7' of the drum 7. When the fillet or fillets F2 pass the band knife the next time, the knife will cut a second slice parallel with the first one, but now with an exact thickness of said 2 mm. One may continue in this way dependent on the thickness of the original fish fillet, such that the band knife is displaced in relation to the drum between each rotation thereof, in order to cut third, fourth slice and so forth parallel with the preceding slice.

Such a finish cut fillet slice on its way out of the machine is indicated at FS.

Reference numeral 30 denotes an outlet chute for scrap 31, FIG. 2, e.g. skin scraped off from the drum mantle face 7' by means of the scraper means 20, 21.

We claim:

1. A method for cutting slices from fish fillets with the skin still on, comprising feeding a fillet toward a rotatable freezing drum having a mantle face, the longitudinal direction of the fillet preferably being oriented in the circumferential direction of the drum causing the fillet to be frozen and retained to said drum at the fillet's skin side; providing a cutting tool, preferably in the form of a driven endless band knife, positioned at a (radial) distance from the mantle face of the drum; cutting a fish meat slice from the fillet adhering to the drum through freezing, the division plane thereof during the cutting-off operation extending substantially parallel with the drum circumference; and displacing said cutting tool's operative cutting edge stepwise in relation to the drum circumference between each revolution of the drum with the retained fillet, in order to successively cut further fish meat slices parallel with the first slice parallel with the two main faces of the original fillet resulting in, one slice for each drum revolution.

2. A machine for cutting slices from fish fillets with the skin still on, comprising an insertion place for a fish fillet; a freezing drum adapted to be frozen to a temperature beneath the freezing point of the fillet; an endless conveyor connected to said insertion place for conducting the fillet to said freezing drum; a cutting tool in the form of a driven endless band knife, the operative cutting edge thereof being radially spaced from the drum's mantle face; and a the suspension frame for the band knife being pivotally suspended around a horizontal axis on a bracket rigidly attached to the machine frame, and said suspension frame being operatively connected to an adjusting device adapted to change the swinging position/orientation of the band knife frame in the vertical plane stepwise around said horizontal axis, the effective distance between the operative cutting edge of the band knife and the drum mantle face being changed stepwise between each revolution of the freezing drum.

3. A machine as set forth in claim 2, wherein the freezing drum is assigned scraper means in order to release the drum mantleface from skin and other waste, said scraper means being displaceably disposed in relation to the drum circumference, between an operative scraping position and an inoperative position, wherein the scraper means is withdrawn outside a circle path described by the fillet frozen to the drum surface, during several successive revolutions of the drum.

4. A machine as set forth in claim 3, wherein the endless conveyor consists of a conveying belt laid around two end rollers, namely a downstream drive roller in relation to the rotatable freezing drum and an upstream turning roller in relation to the same, and wherein the conveyor belt's uppermost conveying portion, over an area beneath the freezing drum extending from a point immediately in front of the freezing drum to a point immediately behind the same, has a deflected course wherein the uppermost portion moves elastically compliant vertically, in order to favor the delivery of the fillet to the drum.

5. A machine as set forth in claim 4, wherein the upper portion of the conveying belt, at each end of said fillet delivery area, as measured in the upper belt portion's direction of motion, is assigned an underlying support roller.

6. A machine as set forth in claim 3, wherein the freezing drum upstream is assigned a fillet-supply-restricting flap which is rotatable around a horizontal axis between an operative, swung-down closing position wherein it blocks the admission path for fish fillet through the conveying belt to the drum, and an inoperative swung-up position wherein said admission path is open.

7. A machine as set forth in claim 4, wherein the freezing drum upstream is assigned a fillet-supply-restricting flap which is rotatable around a horizontal axis between an operative, swung-down closing position wherein it blocks the admission path for fish fillet through the conveying belt to the drum, and an inoperative, swung-up position wherein said admission path is open.

8. A machine as set forth in claim 5, wherein the freezing drum upstream is assigned a fillet-supply-restricting flap which is rotatable around a horizontal axis between an operative, swung-down closing position wherein it blocks the admission path for fish fillet through the conveying belt to the drum, and an inoperative, swung-up position wherein said admission path is open.

\* \* \* \* \*